United States Patent

Pivonka

[15] 3,652,101
[45] Mar. 28, 1972

[54] VEHICLE STABILIZATION APPARATUS

[72] Inventor: William J. Pivonka, W. 334 Woodside, Spokane, Wash. 99208

[22] Filed: Dec. 17, 1969

[21] Appl. No.: 885,862

[52] U.S. Cl. ..............................................280/6.1, 280/6 H
[51] Int. Cl. ......................................................B60g 17/04
[58] Field of Search..............................280/6, 6.1, 6.11, 6 H

[56] References Cited

UNITED STATES PATENTS 2,872,200  2/1959  Kroll.....................................280/6.1
2,278,081  3/1942  Kramer..................................280/6.1

Primary Examiner—Philip Goodman
Attorney—Wells, St. John & Roberts

[57] ABSTRACT

A controlled pendulum is utilized to automatically tilt a vehicle frame uphill to compensate for transverse inclination of the terrain on which the vehicle is riding. The normal gravitational forces exerted on the pendulum due to such transverse inclination are partially counteracted by tension forces proportional to the degree of inclination. The frame is thereby tilted uphill an angular amount in proportion to the amount of transverse inclination encountered. The vehicle frame is pivoted to a ground engaging structure about a longitudinal axis. The pendulum is pivoted about an elevated parallel axis. A pair of control devices are mounted to the frame to detect pendulum movement to either side of a plane containing said axes. Tension springs extend outwardly and downwardly from the pendulum to the vehicle's ground engaging structure. They serve to force the pendulum to an equilibrium condition at an angle relative to the vertical. The monitoring function of the control devices causes the frame to be aligned along this plane which is inclined uphill.

12 Claims, 13 Drawing Figures

INVENTOR.
WILLIAM J. PIVONKA

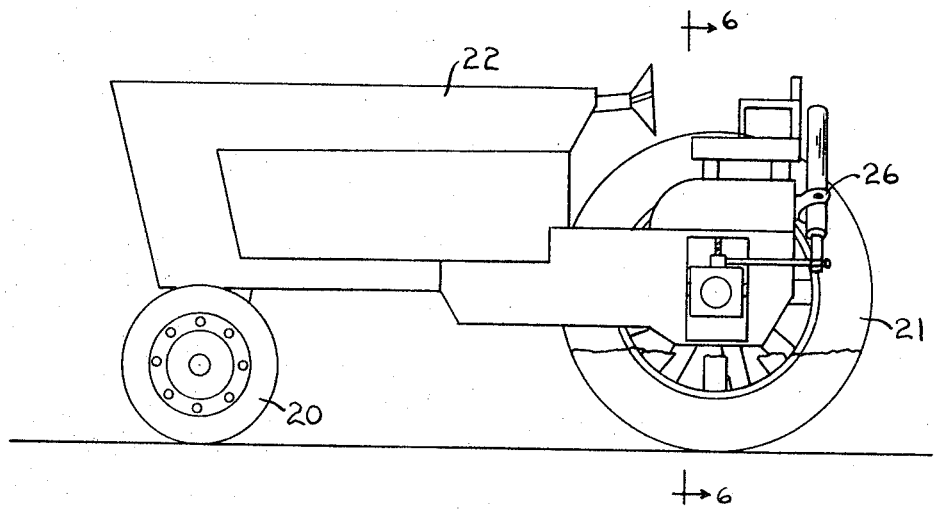
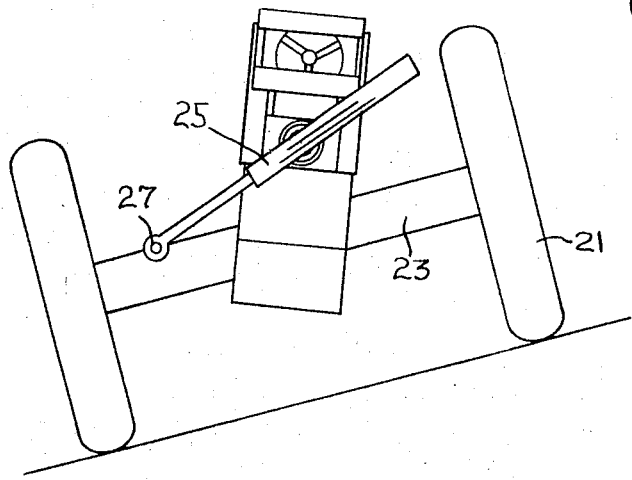
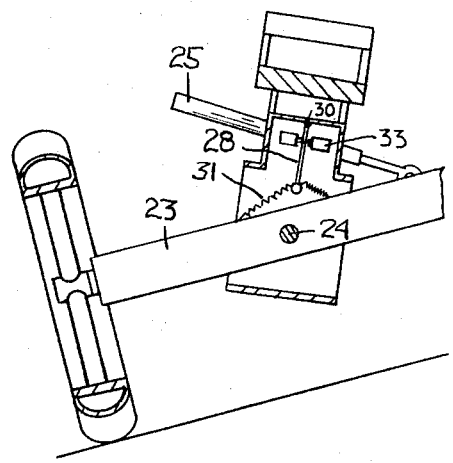

INVENTOR.
WILLIAM J. PIVONKA
BY
Wells, St.John & Roberts
ATTYS.

INVENTOR.
WILLIAM J. PIVONKA
BY
Wells, St. John & Roberts
ATTYS.

VEHICLE STABILIZATION APPARATUS

BACKGROUND OF THE INVENTION

Most ground supported vehicles are designed to ride on level ground, where the weight of the vehicle and elements supported thereby are directed vertically downward through wheels, tracks or other ground engaging elements in proportion to the size and number of such elements. In most instances, the distribution of weight to the ground engaging elements at each side of a vehicle is essentially identical. These normal design factors become unbalanced when a vehicle is driven on terrain that is transversely inclined relative to the horizontal. The vehicle inclination results in the weight of the vehicle being at least partially shifted to the downhill wheels, and seriously affects vehicle traction, stability, and steering along a sidehill area.

The desirability of shifting the weight of a vehicle for balance and stability on sidehills has been previously recognized. A level control for road graders is shown in U.S. Pat. No. 2,883,777. A related type of control for construction equipment is shown in U.S. Pat. No. 3,160,284, which relates to optional methods of either pivoting vehicle structure or moving it laterally to shift the weight uphill. U.S. Pat. No. 3,175,837 shows a device wherein such shifting is accomplished by raising or lowering one wheel relative to the other. In each of the prior patents, the desired vehicle position is level, and the controlling devices are designed to maintain the vehicle frame in an upright or vertical condition.

In agricultural equipment, it has long been recognized that some harvesting equipment, such as combines, must be maintained in an upright condition when used on a side hill. An example of a prior disclosure showing such a leveling arrangement in an agricultural machine is U.S. Pat. No. 2,716,556.

The maneuvering of a vehicle along a sidehill is assisted, but not completely corrected, by positioning the vehicle frame in a vertical orientation as previously recognized in the above patent disclosures and in similar practical applications of this principle. However, I have found pivoting the frame to a vertical position does not fully counteract the moments on the vehicle tending to tilt the vehicle to one side in a downhill direction. These forces are related to the height of the vehicle above the ground, and the fact that forces transmitted to the ground are transmitted through elevated axles above the points of wheel or track contact. I have developed an apparatus for transferring a greater proportion of the vehicle weight to the uphill wheels or tracks, thereby "overleveling" the vehicle and exerting a greater proportion of the vehicle weight on the uphill ground engaging elements. This results in a greater tractive effort by the uphill ground engaging elements, for closely approximating the normal tractive balance encountered on level ground. This apparatus, disclosed below, overcorrects for transverse inclination in proportion to the amount of such inclination, so that the vehicle frame is inclined more sharply as the transverse inclination of the terrain increases.

SUMMARY OF THE INVENTION

The invention is utilized in combination with a vehicle that includes a normally horizontal ground supported structure and a vehicular frame that is pivotally mounted to it about a longitudinal first axis, together with adjustable power operated means for angularly positioning the frame relative to the ground supported structure. The invention specifically relates to an improvement in the apparatus for automatically compensating for transverse inclination of the ground supported structure, including a pendulum and transverse biasing means connected between the pendulum and the ground supported structure to partially overcome the gravitational forces tending to vertically position the pendulum in response to transverse inclination of the ground support structure relative to the horizontal. Control devices are located on the frame at each side of the pendulum to operate the adjustable power operated means in response to movement of the pendulum to either side of a plane containing the pendulum axis and the vehicular frame axis. The control system comprising the pendulum and biasing means is designed to reestablish static equilibrium of the forces on the pendulum with the pendulum aligned along this plane. The equilibrium condition is achieved by pivoting the vehicular frame to a position inclined toward the uphill side of the ground supported structure.

It is a first object of this invention to provide a mechanically simple control apparatus for causing automatic repositioning of a pivoted vehicle frame to compensate for the lateral inclination of the vehicle in response to inclined terrain. The amount of compensation is proportional to the transverse inclination of the terrain.

Another object of this invention is to provide such an apparatus which can be adapted to any type of ground engaging vehicle having provision for pivoting the main vehicular frame or any portion thereof about a longitudinal axis.

Another object of the invention is to automatically compensate for transverse inclination of the vehicle by overleveling, that is, by tilting the vehicular frame or a portion thereof to a position inclined toward the uphill side of the vehicle.

These and further objects will be evident from the following disclosure of the invention, illustrated with respect to conventional ground supported vehicles, it being understood that the invention can be applied to any similar type of vehicle where the overleveling feature is desirable.

BRIEF DESCRIPTION OF THE DRAWINGS

FIG. 4 is a side view of the essential components of a conventional tractor equipped according to this invention;

FIG. 5 is a rear view of the tractor shown in FIG. 1, illustrated as supported on an inclined surface;

FIG. 6 is a fragmentary sectional view taken along line 6—6 in FIG. 4 showing the vehicle similarly inclined;

DESCRIPTION OF THE PREFERRED EMBODIMENTS

The present invention is designed to be applied to any type of vehicle that is subjected to use on sidehills. While its application is directed primarily to construction and agricultural machinery, there is undoubtedly many other fields where the sidehill inclination of vehicles seriously impairs their usage and effectiveness.

Figure 1:
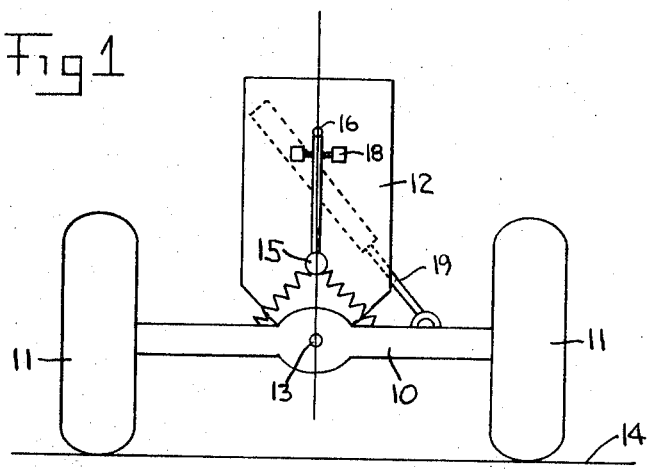
FIG. 1 is a schematic view of a vehicle illustrating the essential physical relationship between the vehicle and control components.
Figure 2:
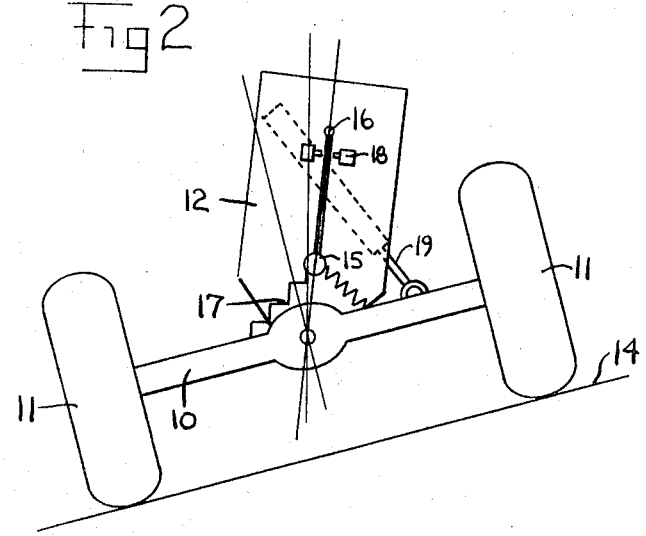
FIG. 2 is a similar schematic view showing a slight transverse inclination of the vehicle.
Figure 3:
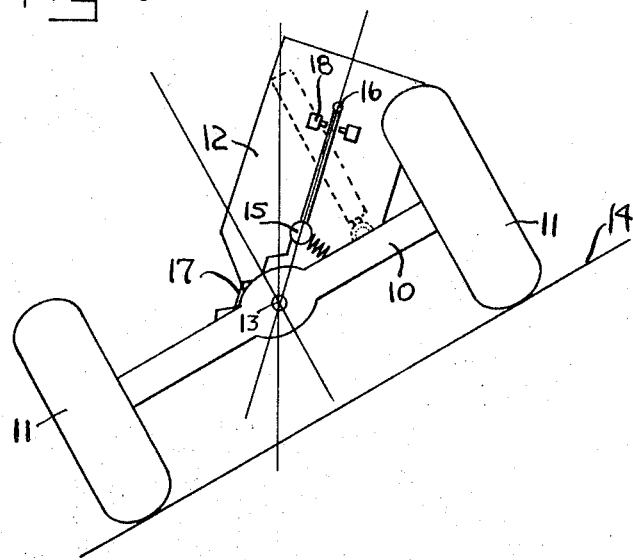
FIG. 3 is another similar schematic view showing a greater transverse inclination.

As shown schematically in FIGS. 1, 2 and 3, the vehicle essentially includes a transverse ground-supported structure, illustrated as an axle 10 and side wheels 11, plus a vehicular frame 12 that is upright and pivoted at its lower end at 13 to the axle 10. The axis of pivot 13 is a central longitudinal axis through axle 10, and is normally parallel to the intended direction of vehicle travel. A power operated device 19 is connected between the axle 10 and frame 12. The device 19 might be a hydraulic cylinder, a rack and pinion, a screw or any other type of apparatus which can angularly position frame 12 relative to axle 10 about the pivot 13.

For normal operation on level ground, the frame 12 is conventionally maintained in an upright vertical orientation as shown in FIG. 1. However, should the ground surface 14 engaged by the wheels 11 be transversely inclined from the horizontal, as shown in FIGS. 2 and 3, the vertical forces which are normally exerted equally upon wheels 11 will become unbalanced due to the transverse shifting of the center of gravity of the vehicle relative to the points of contact of wheels 11 with the ground surface 14. To counteract this tendency, the power operated device 19 is controlled by movement of a pendulum 15 relative to frame 12.

Pendulum 15 is pivoted to frame 12 at 16 about a longitudinal axis above and parallel to the axis of pivot 13. The pendulum axis at 16 and the axis at pivot 13 are located in a common vertical plane when the ground-supported structure is on transversely level terrain. The pendulum 15 is not entirely free to pivot itself relative to frame 12 due to gravity, as is conventional in prior leveling devices. Biasing elements, in the form of tension springs 17, are connected between pendulum 15 and axle 10. The springs 17 extend downwardly and transversely outward to each side of pendulum 15 and are balanced when pendulum 15 and frame 12 are in vertical upright positions as illustrated in FIG. 1. However, upon inclination of the ground supported structure 10 as shown in FIGS. 2 and 3, the forces exerted on pendulum 15 by springs 17 will become unbalanced and will partially overcome the normal gravitational forces thereby applied to pendulum 15.

The unbalanced condition across pendulum 15 is monitored by a control device 18 in the form of one or more switches or valves on frame 12, which detect any movement of pendulum 15 from a plane containing the axes at pivots 16 and 13. The device 18 is used to control the power operated device 19 so as to pivot frame 12 about pivot 13 relative to axle 10 and wheels 11 until static equilibrium is achieved between the forces exerted on pendulum 15 and pendulum 15 is once again aligned along the plane containing the axis of pivots 16 and 13. The device 18 shown to the left of pendulum 15 in FIGS. 1-3 controls device 19 to pivot frame 12 clockwise about pivot 13 when actuated. The device 18 to the right of pendulum 15 controls device 19 oppositely, to effect counter-clockwise movement. Due to the geometry of this arrangement and the increasing spring forces which result from increased vehicle inclination, equilibrium will be attained with frame 12 in a position inclined increasingly toward the uphill side in response to increasing inclination of the ground surface 14. This can be seen by comparison of the angles of inclination illustrated in FIGS. 2 and 3. A more detailed discussion of the geometry and force relationships used to automatically compensate for transverse inclination of the vehicle will be developed below.

FIGS. 4-6 illustrate generally the manner by which this structure could be applied to an agricultural tractor. The tractor is shown as comprising conventional central forward wheels 20 and larger rear wheels 21 located to each side of a tractor frame 22. Frame 22 is pivotally connected to the rear axle 23 by a pivot shaft 24 (FIG. 6). The position of frame 22 relative to axle 23 is controlled by a hydraulic cylinder assembly 25 pivoted to the vehicle frame by a trunnion at 26 and pivoted to axle 23 at 27. Mounted above axle 23 is a pendulum 28 pivotally connected to frame 22 about an axis at 30 located above the axis of pivot shaft 24. Tension springs 31 are connected to each side of the pendulum 28. The springs 31 are respectively anchored to axle 23 and are balanced when frame 22 is in a vertical position with the vehicle on level terrain. A pendulum monitoring switch 33 is illustrated as mounted to frame 22, the switch 33 serving to detect any movement of pendulum 28 from the plane containing the axes at 24 and 30. FIGS. 5 and 6 illustrate the manner by which this structure overlevels the frame 22 in response to encountering transverse inclination of the ground on which the tractor is supported.

Figure 7:
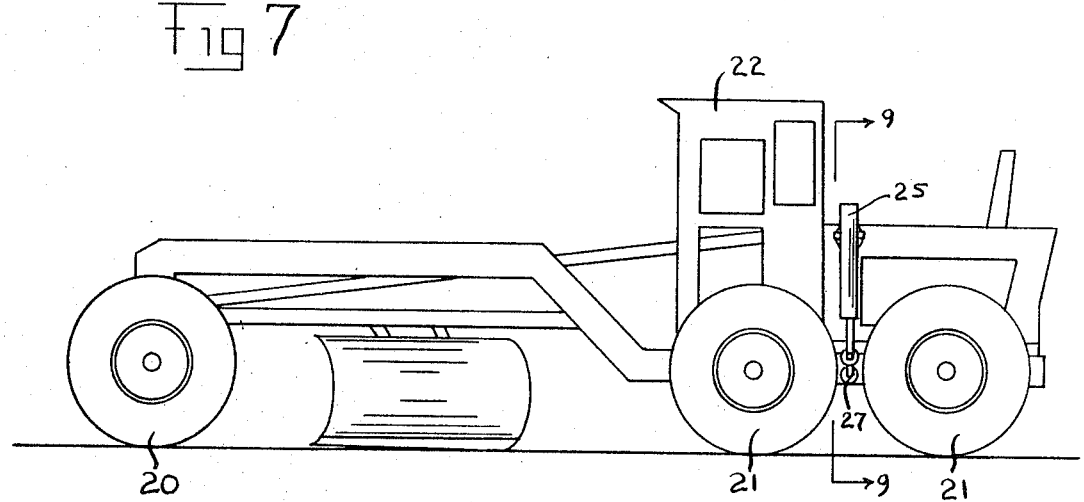
FIG. 7 is a side view of a road grader equipped according to this invention.
Figure 8:
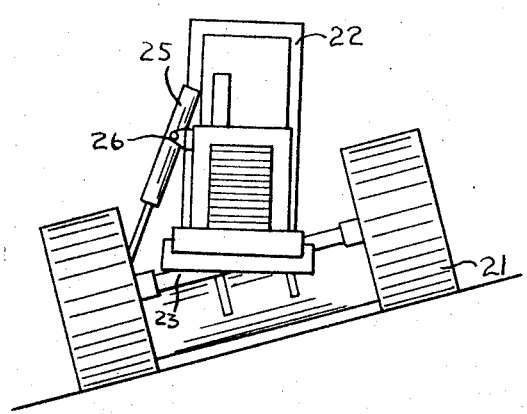
FIG. 8 is a rear view of the grader shown on a transversely inclined surface.
Figure 9:
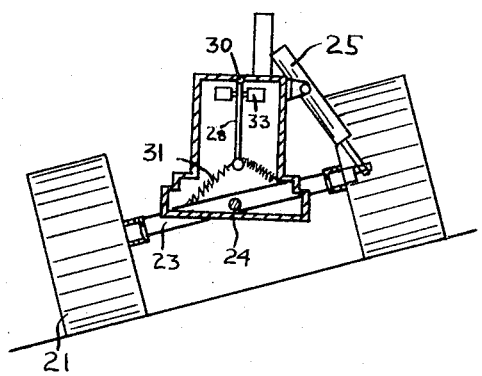
FIG. 9 is a sectional view taken along line 9—9 in FIG. 7 showing the control components with the vehicle similarly inclined.

FIGS. 7-9 similarly illustrate one physical arrangement by which the present invention could be applied to a conventional road grader. The same general elements are illustrated as with respect to the tractor shown in FIGS. 4-6, and the numerals used in relation to the tractor elements have been similarly applied to the elements of the road grader.

FIGS. 10-13 are presented so as to better explain the geometric and force relationships that cause the mechanical control device to automatically compensate for the ground inclination in proportion to the degree of such inclination. In these figures, the same numerals have been applied as were shown in the schematic diagrams of FIGS. 1, 2 and 3. The forces exerted on pendulum 15 are indicated by vectors, using arrows showing force direction and magnitude. The gravitational force on pendulum 15 is illustrated by the vector W. The tensile forces exerted by springs 17 are illustrated by vectors $F_1$ and $F_2$. The control devices 18 are designated as $S_1$ and $S_2$, to signify opposed switches or other control devices that monitor pivotal movement of pendulum 15 about axis 16. The plane containing the respective axis of pivots 13 and 16 is shown in FIGS. 10 through 13 as being along a line Y—Y and will be termed the "Y-axis." The plane across the ground supported structure illustrated by axle 10 is indicated by the line X—X and will be termed the "X-axis."

Figure 10:
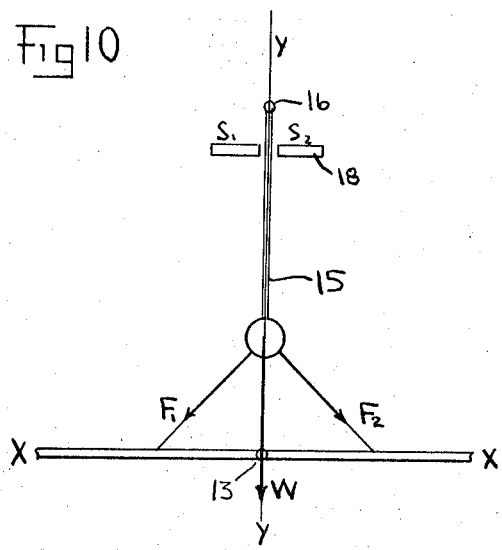
FIGS. 10–13 are a series of force diagrams designed to illustrate the manner by which equilibrium is achieved in the pendulum control member.

In FIG. 10, normal static equilibrium of all elements is illustrated when the X-axis is in a horizontal position. The spring forces balance one another and the gravitational force W is aligned along the Y-axis so that the device 18 is inactive.

Figure 11:
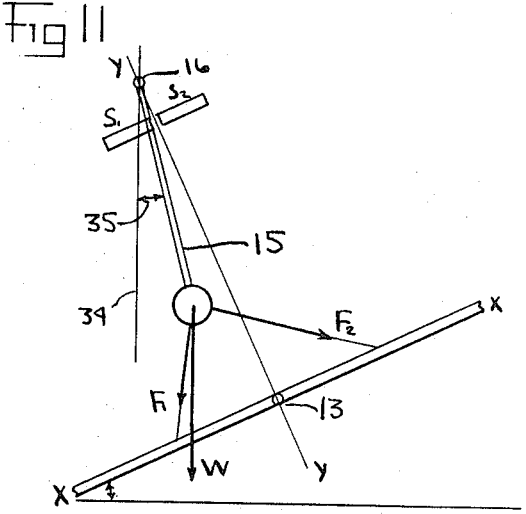

FIG. 11 illustrates the position that would be attained by pendulum 15 upon inclination of the X-axis were compensation not made by repositioning of the Y-axis. Were pendulum 15 not subjected to spring forces $F_1$ and $F_2$ it would achieve and maintain a vertical position along a vertical line 34 through the axis of pivot 16. However, it is prevented from achieving such a vertical position due to the imbalance between forces $F_1$ and $F_2$, which tends to position pendulum 15 at an angular inclination relative to vertical line 34. This inclination is indicated angularly at 35.

As mentioned, the extreme equilibrium condition shown in FIG. 11 is not achieved in reality, since initial movement of pendulum 15 to the downhill side of the Y-axis will be detected by the device $S_1$. The device $S_1$ is operatively connected to the controls for the power operated device 19 to cause the device 19 to tilt the frame 12 toward the uphill side of the vehicle. The clockwise correction of the Y-axis about pivot 13 will continue until static equilibrium is achieved with the pendulum 15 again aligned along the Y-axis.

Figure 12:
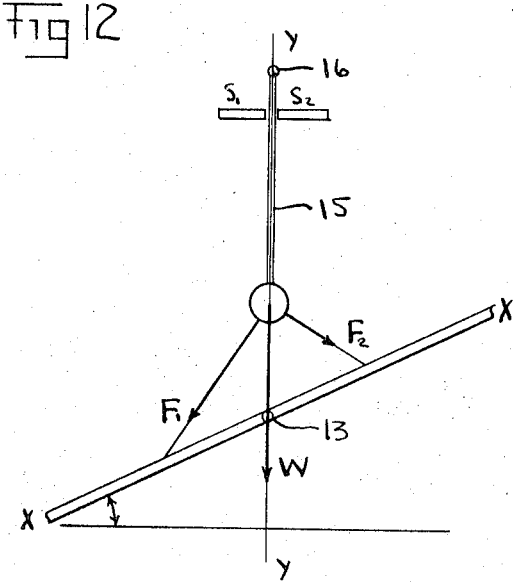

As shown in FIG. 11, initial activation of device $S_1$ will be due to the gravitational force W which tends to move pendulum 15 to the downhill side of the Y-axis. However, as the Y-axis is pivoted, the pendulum 15 is also pulled to the downhill side of the Y-axis due to the fact that the greater stretching of the downhill spring 17 will cause force $F_1$ to be in excess of force $F_2$. FIG. 12 illustrates an unbalanced vertical position of pendulum 15, wherein the gravitational force W is along the Y-axis and $F_1$ is greater than $F_2$. This is illustrated to show that the control device 18 will not deactivate when the Y-axis reaches the vertical, but that the device $S_1$ will continue to operate beyond this condition due to the force $F_1$ on the downhill side of the pendulum 15.

Figure 13:
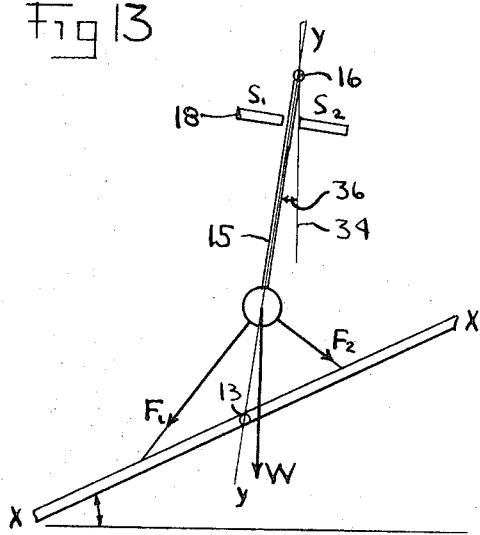

FIG. 13 shows the ultimate equilibrium position again achieved by the pendulum 15, wherein the moments exerted on pendulum 15 about its axis 16 are in balance, with pendulum 15 aligned along the Y-axis and the control devices 18 thereby being rendered inactive. At this equilibrium position, the vertical line 34 through the pivot 16 has been shifted to the uphill side of pendulum 15, which is positioned at an angle 36 relative to the vertical.

The structural and force relationships illustrated can be achieved by other equivalent arrangements using elements that will act upon pendulum 15 in the manner illustrated so that the vehicle frame will be overleveled to the uphill side of the supporting structure. The tension springs or devices might be replaced by compression springs or devices at the opposite side of pivot 16. To achieve the proportional correction illustrated in FIGS. 2 and 3, it is desirable that the biasing of pendulum 15 be provided by tension or compression elements such as springs which will exert forces on the pendulum in proportion to the lengthening or shortening or the spring length. Therefore, as these forces become greater due to greater inclination of the ground, the angle of inclination of the pendulum 15 in the ultimate equilibrium condition will be proportionally increased.

The relative magnitudes of forces $F_1$ and $F_2$ in comparison to the weight of the pendulum 15 varies the angular amount of overleveling achieved. The moment exerted about pivot 16 due to the unbalance that exists between the spring forces in any event must only partially overcome the moment initially exerted due to the weight of the pendulum itself. The design of the biasing springs or other devices should be such as to maintain a proportionality between the spring forces and transverse angle of inclination along the full range of anticipated inclination.

When desired suitable manual controls can be provided to either inactivate this control unit entirely, or to manually override the apparatus so as to incline the vehicle frame as required for vehicular operation.

Various changes can obviously be made in the structure without deviating from the basic relationship developed above. Therefore, it is anticipated that such modifications and use of equivalent or alternate elements will be embraced within the scope of this disclosure.

Having thus described my invention, I claim:

1. In combination with a vehicle comprising:
a ground supported structure;
a vehicular frame pivotally mounted to said structure about a first longitudinal axis thereon;
and power operated means connected between said structure and said frame for angularly positioning said frame relative to said structure about said longitudinal axis;
an improvement in a control system for said power operated means, comprising:
a pendulum pivotally mounted on said frame about a second longitudinal axis parallel to and elevationally spaced from said first longitudinal axis, said first and second axes being located in a common vertical plane when the ground supported structure is on transversely level terrain;
transverse biasing means connected between said pendulum and said ground supported structure for partially opposing normal gravitational positioning of the pendulum about said second longitudinal axis by exerting an unbalanced moment on the pendulum in response to transverse inclination of the ground supported structure;
and control means on said frame in the pivotal path of movement of the pendulum about said second longitudinal axis for detecting movement of the pendulum from a position in which the pendulum is aligned along a plane containing said first and second longitudinal axes, said control means being operatively connected to said power operated means for selectively causing said power operated means to pivot said frame relative to said ground supported structure about said first longitudinal axis in response to movement of the pendulum detected by said control means in a direction and amount such as to center the pendulum along a plane containing said first and second longitudinal axes and balance the moment exerted on the pendulum by said biasing means.

2. An apparatus as set out in claim 1 wherein said biasing means opposes gravitational positioning of the pendulum with a progressively greater force in proportion to the amount of transverse inclination of the ground supported structure relative to the horizontal.

3. An apparatus as set out in claim 1 wherein said transverse biasing means comprises first and second yieldable spring members extending to opposite transverse sides of said pendulum, each spring member being connected to the pendulum and to the ground supported structure, the forces exerted upon the pendulum by said spring members being balanced when said ground supported structure is on transversely level terrain.

4. An apparatus as set out in claim 3 wherein said spring members are constructed such that the resultant force exerted upon the pendulum by said spring members is progressively increased in proportion to the increasing degree of inclination of the supporting terrain relative to the horizontal.

5. In combination with a vehicle comprising:
a ground supporting structure;
a vehicular frame pivotally mounted to said structure about a first longitudinal axis thereon;
and power operated means for angularly positioning said vehicular frame relative to said structure about said longitudinal axis;
an improvement in the control system for said power operated means, comprising:
a rigid pendulum pivotally mounted to said vehicular frame about a second longitudinal axis parallel to and located elevationally above the first longitudinal axis, said first and second axes being located in a common vertical plane when the ground supported structure is on transversely level terrain;
yieldable biasing means connected between said pendulum and said ground supported structure for exerting forces thereon directed downwardly and transversely outward to each side of each said pendulum, said biasing means being respectively connected to said ground supported structure at each side of said first longitudinal axis, said biasing means being designed to partially overcome the moment of the pendulum about said second longitudinal axis due to gravity in response to transverse inclination of the ground supported structure;
and control means on said vehicular frame in the pivotal path of movement of the pendulum about said second longitudinal axis for detecting movement of the pendulum from a position in which the pendulum is aligned along a plane containing said first and second longitudinal axes, said control means being operatively connected to said power operated means for selectively causing said power operated means to pivot said vehicular frame relative to said ground supported structure about the first longitudinal axis in response to movement of the pendulum detected by said control means caused by transverse inclination of said ground supported structure and frame relative to the horizontal, the direction and amount of pivotal movement so imparted to the frame being such as to center the pendulum along a plane containing said first and second longitudinal axes and balance the forces exerted on said pendulum by said biasing means.

6. An apparatus as set out in claim 5 wherein said control means comprises:
a reversible control device mounted to said vehicular frame, said control device having an operating element in the pivotal path of movement of the pendulum about the second axis for detection of movement of the pendulum from a plane containing said first and second longitudinal axes.

7. An apparatus as set out in claim 5 wherein said biasing means comprises:
first and second tensioning members, each having one end operatively connected to the pendulum and each having its remaining end connected to said ground supported structure.

8. In combination with a vehicle comprising:
a first frame;
ground engaging elements movably mounted at the transverse sides of said first frame, said first frame being positioned transversely parallel above the terrain engaged by said elements;
a second frame extending upwardly from said first frame, said second frame being pivotally connected to said first frame about a first central longitudinal axis thereon;
and power operated means connected to said first and second frames for pivotally locating said second frame relative to said first frame about said first longitudinal axis;
the improvement in a control system for said power operated means, comprising:

a rigid pendulum suspended from said second frame about a second longitudinal axis, said first and second axes being located in a common vertical plane when the first frame is on transversely level terrain;

biasing means operatively connected between said first frame and said pendulum for partially overcoming the gravitational forces exerted on the pendulum about said second longitudinal axis by exerting transversely unbalanced forces thereon in response to transverse inclination of said first frame;

and means on said second frame in the pivotal path of movement of said pendulum about said second longitudinal axis for detecting movement of the pendulum from a position at which the pendulum is aligned along a plane containing said first and second longitudinal axes, said last-named means being operatively connected to said power operated means, said last-named means being set into operation when the pendulum moves about said second longitudinal axis from a position aligned along a plane containing said first and second longitudinal axes, said last-named means being operable, when set into operation, to cause the second frame to pivot about said first longitudinal axis in response to movement of the pendulum about said second axis until the pendulum and biasing means attain static equilibrium and the pendulum is again aligned along a plane containing said first and second longitudinal axes.

9. In combination with a vehicle comprising:

a normally horizontal transverse ground supported structure;

an upright vehicular frame pivotally mounted to said ground supported structure about a longitudinal first axis parallel to the intended direction of travel of the vehicle;

adjustable means operatively connected between said vehicular frame and said ground supported structure for angularly positioning said vehicular frame about said first axis relative to said ground supported structure;

an improvement in the apparatus for automatically causing said adjustable means to compensate for transverse inclination of said ground supported structure, comprising:

a pendulum pivotally suspended on said frame about a second axis parallel to and elevationally spaced from said first axis, said first and second axes being located in a common vertical plane when the ground supported structure is on a transversely level terrain;

transverse biasing means operatively connected between said pendulum and said ground supported structure for exerting on said pendulum a unbalanced transverse force partially overcoming the gravitational forces tending to position said pendulum about said second axis in response to transverse inclination of the ground supported structure;

and control means mounted to said frame, said control means including a pair of elements respectively located to each side of a longitudinal plane containing said first and second axes, said elements being positioned in the path of movement of said pendulum so as to be alternately contacted thereby upon movement of the pendulum from said plane, said control means being operatively connected to said adjustable means for causing the vehicular frame to be angularly repositioned about said first axis by said adjustable means in response to pivotal movement of the pendulum about said second axis caused by transverse inclination of the ground support structure so as to reestablish static equilibrium of the forces on said pendulum due both to gravity and said biasing means with the pendulum again aligned along said plane.

10. An apparatus as set out in claim 9 wherein the location of said second axis is vertically above said first axis when the ground supported structure is in its normally horizontal position.

11. An apparatus as set out in claim 9 wherein the location of said second axis is offset toward the uphill side of the ground supported structure from a vertical plane including said first axis when said ground supported structure is inclined transversely relative to the horizontal.

12. An apparatus as set out in claim 9 wherein said transverse biasing means includes spring members extending between the ground supported structure and said pendulum at each side of said pendulum, said spring members being designed such that the resultant force exerted upon the pendulum becomes progressively greater in proportion to the amount of transverse inclination of the ground supported structure relative to the horizontal.

* * * * *